United States Patent [19]
Heidenfelder et al.

[11] Patent Number: 6,145,490
[45] Date of Patent: Nov. 14, 2000

[54] METHOD FOR OPERATING A DIRECT-INJECTION INTERNAL COMBUSTION ENGINE DURING STARTING

[75] Inventors: Hans Dieter Heidenfelder, Waiblingen; Christoph Eisath, Haibach; Wolf-Eike Holtschmit, Völklingen; Bernd Baur, Esslingen; Christoph Lux, Stuttgart; Stefan-Max Weber, Regensburg, all of Germany

[73] Assignees: Siemens Aktiengesellschaft, Munich, Germany; DaimlerChrysler AG, Stuttgart, Germany

[21] Appl. No.: 09/318,391

[22] Filed: May 25, 1999

[30] Foreign Application Priority Data

May 25, 1998 [DE] Germany ............... 198 23 280

[51] Int. Cl.$^7$ ...................................................... F02B 17/00
[52] U.S. Cl. .......................................... 123/295; 123/305
[58] Field of Search ..................................... 123/295, 305

[56] References Cited

U.S. PATENT DOCUMENTS

| | | | |
|---|---|---|---|
| 5,718,203 | 2/1998 | Shimada et al. | 123/435 |
| 5,806,491 | 9/1998 | Ohtake | 123/435 |
| 5,941,213 | 8/1999 | Ishii et al. | 123/305 |
| 5,950,595 | 9/1999 | Yoshioka et al. | 123/295 |
| 6,006,720 | 12/1999 | Yanagihara et al. | 123/305 |
| 6,041,757 | 3/2000 | Kadota | 123/295 |

OTHER PUBLICATIONS

"Gasoline Direct Injection—An Integrated Systems Approach" (Fraidl et al.), Conference "Engine and Environment" 97, pp. 255–278.

Primary Examiner—John Kwon
Attorney, Agent, or Firm—Herbert L. Lerner; Laurence A. Greenberg; Werner H. Stemer

[57] ABSTRACT

A changeover is made between a so-called low-pressure starting with a homogeneous mixture and a so-called high-pressure starting with a stratified mixture as a function of an engine coolant temperature. Since, during the high-pressure starting of the internal combustion engine, injection is released only when a pressure in a high-pressure accumulator exceeds a predetermined threshold value, the injected fuel is better prepared. During such high-pressure starting, injection is predetermined by an injection quantity and an angle of an end of injection. Predetermining the angle of the end of injection, in contrast to predetermining an angle of commencement of injection during conventional low-pressure starting, ensures that there is an ignitable mixture present at the sparkplug, specifically irrespective of a duration of injection.

12 Claims, 2 Drawing Sheets

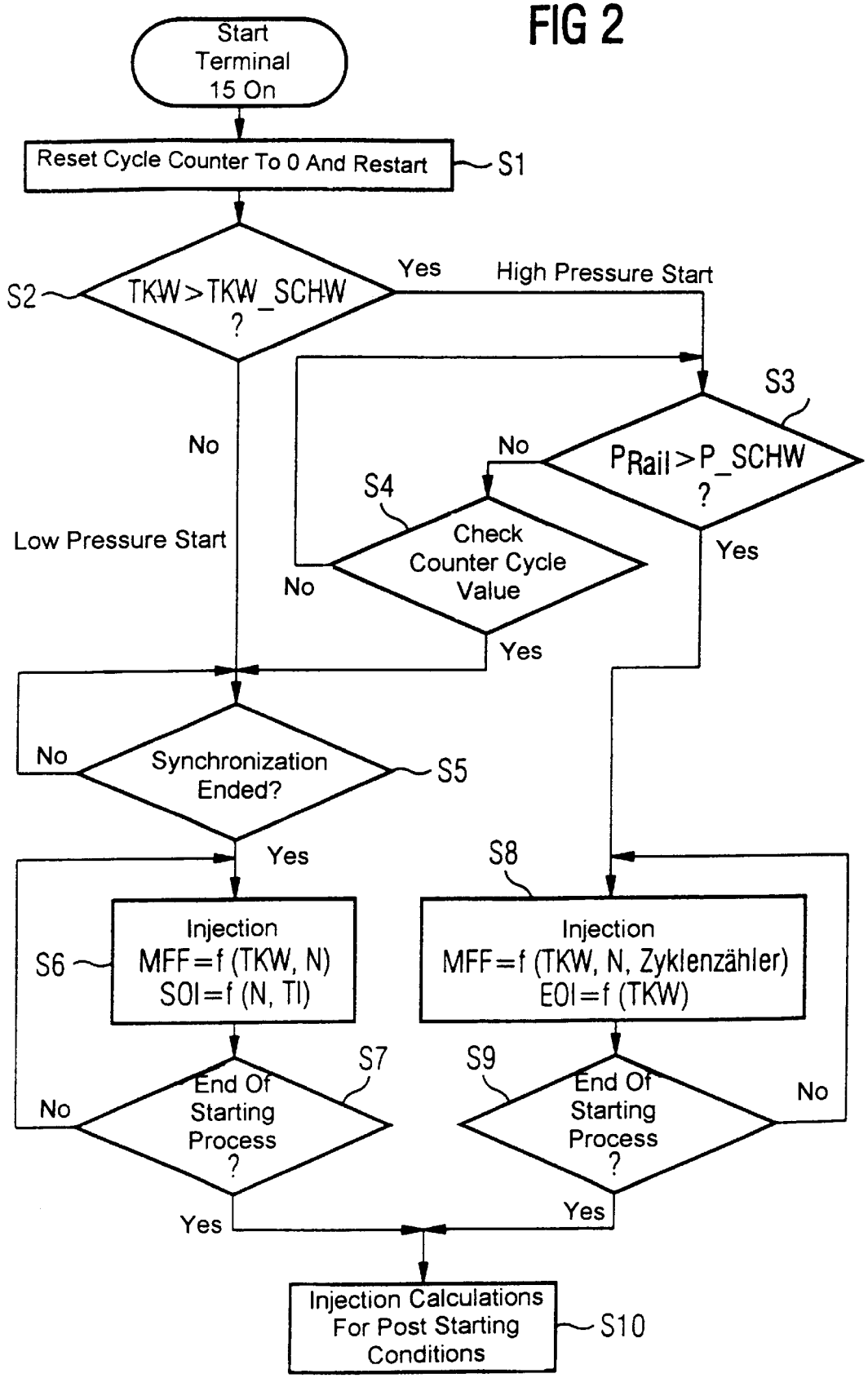

METHOD FOR OPERATING A DIRECT-INJECTION INTERNAL COMBUSTION ENGINE DURING STARTING

BACKGROUND OF THE INVENTION

Field of the Invention

The invention relates to a method for operating a direct-injection internal combustion engine under starting conditions. The internal combustion engine is capable of being started selectively with homogeneous or stratified operating conditions and predetermined engine control parameters for the homogeneous and the stratified operation are calculated for this purpose.

Internal combustion engines with direct injection have great potential for reducing fuel consumption, while at the same time ensuring relatively low pollutant emission. In contrast to manifold injection, in direct injection fuel under high pressure is injected directly into the combustion chamber.

Direct injection, by giving a free choice of injection timing, makes it possible for the internal combustion engine to run in various operating modes. In the case of very early injection during the intake stroke, substantial charge homogenization is achieved, and, consequently, homogeneous operation which is used for maximum air utilization under full load, sometimes also during cold starting and warming up, and, in particular, for homogeneous part-load operation. In the case of late injection timing during the compression stroke, more or less pronounced charge stratification is obtained, and, consequently, stratified operation which is employed largely in extremely lean part-load operation. The ignition timings may also be selected differently (see, in this respect, AVL Tagung "Motor und Umwelt" [AVL Conference "Engine and Environment"] 1997, "Otto-Direkteinspritzung—ein ganzheitlicher Systemansatz" ["Direct Gasoline Injection—An Overall System Approach"], pages 255–271).

In direct-injection internal combustion engines it is known, furthermore, for the starting process to take place in the homogeneous operating mode. In this case, the fuel injection quantity and the angle of commencement of injection are predetermined, and injection commences immediately after synchronization is concluded.

Since, immediately after the starting process has commenced, because of the mechanical drive of the fuel high-pressure pump the pressure in the high-pressure accumulator (rail pressure) is determined essentially by the electrically driven feed pump and therefore has relatively low values, the injected fuel is inadequately prepared (large fuel droplets). The duration of injection, and consequently also the end of injection, changes, depending on the rail pressure. The result of this, under some circumstances, is that there is no ignitable mixture present at the sparkplug and there is a very long timespan until the starting process has ended. Such a starting process is also termed low-pressure starting.

SUMMARY OF THE INVENTION

It is accordingly an object of the invention to provide a method for operating a direct-injection internal combustion engine during starting which overcomes the above-mentioned disadvantages of the prior art methods of this general type, in which the starting process can be reduced.

With the foregoing and other objects in view there is provided, in accordance with the invention, an improved method for operating a direct-injection internal combustion engine during starting, the direct-injection internal combustion engine capable of being started selectively by one of homogeneous and stratified operation, and predetermined engine control parameters being calculated for the homogeneous and the stratified operation, the improvement which includes:

selecting between operating with a homogenous mixture and with a stratified mixture in dependence on a variable characterizing a temperature of the direct-injection internal combustion engine;

operating with the stratified mixture only if a fuel pressure has reached a predetermined threshold value; and predetermining injection via an injection quantity and an angle of an end of injection as parameters if operating with the stratified mixture.

A changeover between so-called low-pressure starting with a homogeneous mixture and so-called high-pressure starting with a stratified mixture is made as a function of a variable, in particular the coolant temperature, characterizing the temperature of the internal combustion engine. Since, during the high-pressure starting of the internal combustion engine, injection is enabled only when the pressure in the high-pressure accumulator exceeds a predetermined threshold value, the injected fuel is better prepared (smaller fuel droplets). During such high-pressure starting, injection is predetermined by the injection quantity and the angle of the end of injection. Predetermining the angle of the end of injection, in contrast to predetermining the angle of commencement of injection during conventional low-pressure starting, ensures that an ignitable mixture is present at the sparkplug, specifically irrespective of the duration of injection. Advantageously, during high-pressure starting, the injection time is limited to the earliest possible commencement of injection, so that there is no injection into the expansion stroke. By contrast, during low-pressure starting, the injection time is limited in respect of the end of injection, so that injection does not take place into the ignited fuel/air mixture, which would lead to a large amount of soot being generated.

Other features which are considered as characteristic for the invention are set forth in the appended claims.

Although the invention is illustrated and described herein as embodied in a method for operating a direct-injection internal combustion engine during starting, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a flow chart explaining the method for direct-injection according to the invention.

DESCRIPTION OF THE PREFERRED EMBODIMENTS

Figure 1:
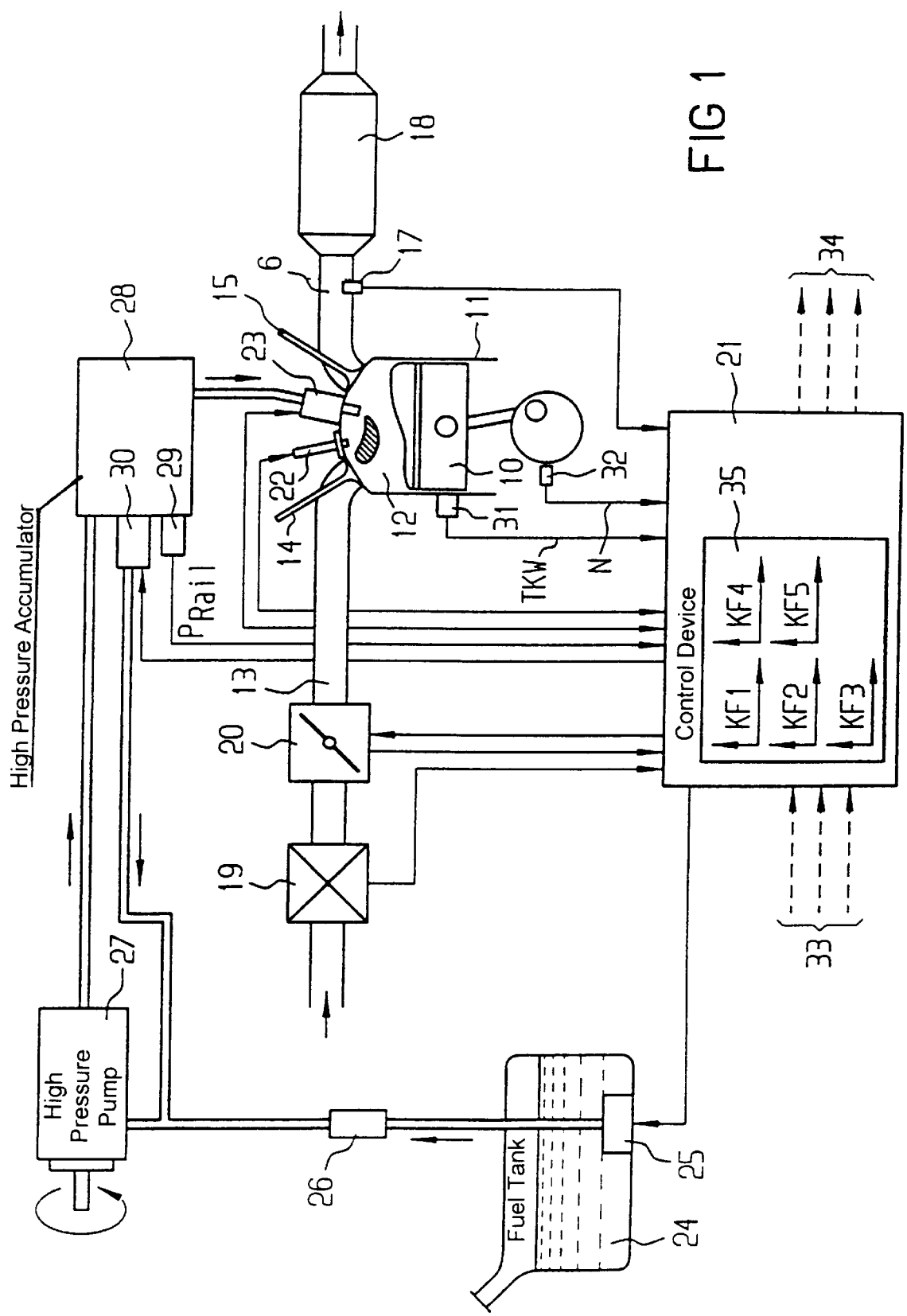
FIG. 1 is a diagrammatic, block diagram of a direct-injection internal combustion engine with a high-pressure accumulator and with an associated control device.

In all the figures of the drawing, sub-features and integral parts that correspond to one another bear the same reference symbol in each case. Referring now to the figures of the drawings in detail and first, particularly, to FIG. 1 thereof, there is shown a highly diagrammatic illustration of an internal combustion engine with a high-pressure accumulator device (common rail). For the sake of clarity, only those parts necessary for understanding the invention are indicated here. In particular, only one cylinder of a multicylinder internal combustion engine is illustrated.

The reference symbol 10 designates a piston that delimits a combustion chamber 12 in a cylinder 11. Into the combustion chamber 12 opens an intake duct 13, through which the combustion air flows into the combustion chamber 12 through an inlet valve 14 in a controlled manner. Under the control of an outlet valve 15, an exhaust-gas duct 16 branches off from the combustion chamber 12 and has disposed further along it an oxygen sensor (lambda probe) 17 and an $NO_x$ storage catalyst 18. The $NO_x$ storage catalyst 18 serves for making it possible to adhere to the required exhaust gas limit values in operating ranges of the internal combustion engine with lean combustion. The catalyst, by its coating, adsorbs the $NO_x$ compounds in the exhaust gas which are generated during lean combustion.

The fresh air necessary for combustion in the cylinder 11 flows via a non-illustrated air filter and an air mass meter 19 into the intake port 13 to a throttle valve 20. The throttle valve 20 used is preferably an electromotively driven throttle member, the opening cross section of which can be set not only by driver actuation (driver's wish) but also as a function of operating parameters of the internal combustion engine via signals from a control device 21 (electronic gas system). It is consequently possible, for example, to reduce both disturbing load cycle reactions of the vehicle during abrupt acceleration or deceleration as torque jumps in the transition from operation with a homogeneous mixture to operation with a stratified charge and an unthrottled air path. At the same time, for monitoring and checking, a signal for the position of the throttle valve 20 is transmitted to the control device 21.

A sparkplug 22 and an injection valve 23, through which fuel can be injected, as required, into the combustion chamber 12, project into the latter. The feed and supply of the fuel for the injection valve 23 are carried out by a known common-rail system for direct gasoline injection. In this case, the fuel is fed under low pressure (typically 3 bar) from a fuel tank 24 by an electric fuel pump 25, usually disposed within the tank and having a prefilter, and is subsequently led via a fuel filter 26 to a fuel high-pressure pump 27. The fuel high-pressure pump 27 is preferably driven mechanically by coupling to the crankshaft or the camshaft of the internal combustion engine. The pump increases the fuel pressure to a maximum value of typically 100 bar in a high-pressure accumulator 28 (common rail), to which the delivery lines of all the injection valves are connected. The pressure in the high-pressure accumulator 28 is detected by a pressure sensor and a corresponding pressure signal $P_{rail}$ is transmitted to the control device 21. With the aid of a pressure regulator 30, the pressure in the high-pressure accumulator 28 is set at a constant value. Excess fuel is not returned to the fuel tank 24, but to the inlet of the fuel high-pressure pump 27.

A temperature sensor 31 detects a signal corresponding to the temperature of the internal combustion engine, preferably via a measurement of the coolant temperature TKW. The speed N of the internal combustion engine is detected with the aid of a sensor that senses markings of the crankshaft or of a transmitter wheel connected to the latter. Both of these signals and the signal from the air mass meter 19 are delivered to the control device 21 for conditioning and further processing, in particular for calculating the injection quantity or injection time and the angle of commencement of injection and angle of the end of injection.

Other control parameters required for the controlled/regulated operation of the internal combustion engine, such as, for example, an accelerator pedal position, a temperature of the intake air, a throttle valve position, signals from knock sensors, a battery voltage, driving dynamics requirements etc., are likewise delivered to the control device 21 and in the FIG. 1 are identified, in general, by the reference symbol 33. With the aid of the control parameters, the internal combustion engine is controlled or regulated in the control device 21 by the execution of filed control routines. For this purpose, various final controlling elements, which each contain an actuating drive and an actuator, for example the throttle valve 20 and the injection valves 23, are activated via signals. In the FIG. 1, the signals are identified, in general, by the reference symbol 34. Moreover, the control device 21 has a memory 35, in which, inter alia, a plurality of characteristic maps KF1–KF5 are stored, the significance of which is explained in more detail with the assistance of the description of FIG. 2.

After the starting of the internal combustion engine (terminal 15 on), in a first method step S1 a content of a cycle counter is reset to the value zero and is restarted. In the case of a 4-cylinder internal combustion engine, half a revolution of the crankshaft is to be understood, here, as a cycle. It is also possible, however, for the cycle counter to sum up a number of work cycles after the starting of the internal combustion engine.

Subsequently, in method step S2, the coolant temperature TKW detected by the temperature sensor 31 is compared with a threshold value TKW SCHW. The threshold value TKW_SCHW is determined by tests and is stored in the memory 35 of the control device 21. If the temperature TKW of the coolant is below the threshold value or is equal to the threshold value, a so-called low-pressure start is carried out and the method is continued with method step S5. In this case, a check is made as to whether synchronization for the injection process has already ended. This interrogation is repeated within a loop, until the interrogation gives a positive result. If this is so, the injection quantity MFF is read out from a characteristic map KF1 of the memory 35 in method step S6. Values for the injection quantities MFF in mg/stroke are stored in the characteristic map KF1 as a function of the coolant temperature TKW and the speed N.

Moreover, the angle of start of injection (SOI) is read out from a characteristic map KF2 of the memory 35 as a function of the speed N and injection time TI, the injection time TI being obtained from the value of the pressure $P_{rail}$ in the high-pressure accumulator 28. Injection is carried out by these parameters.

Subsequently, in method step S7, it is interrogated as to whether the end of the starting process is already reached. The starting process is concluded when the speed N detected by the speed sensor has exceeded a predetermined limit value. If the interrogation gives a negative result, method step S6 is executed repeatedly, otherwise the calculation of the parameters for the injection process takes place in the customary way for operating the internal combustion engine outside the starting process (method step S10).

If the result of the interrogation in method step S2 is that the temperature of the coolant TKW has exceeded the threshold value TKW_SCHW, a check is made, in method step S3, as to whether the pressure $P_{rail}$ in the high-pressure accumulator 28, detected by the pressure sensor 29, has exceeded a predetermined threshold value P_SCHW. The threshold value P_SCHW is stored in a characteristic map KF3 of the control device 21 as a function of the coolant temperature TKW. If the current value of the pressure is below the threshold value P_SCHW, it is interrogated, in method step S4, as to whether the value of the cycle counter has exceeded a predetermined threshold value. If this is so, there is a branch to method step S5 and the parameters for so-called low-pressure starting are calculated, as already explained with reference to method steps S6, S7 and S10. It has not been possible, within the predetermined number of cycles, to build up in the high-pressure accumulator such a high pressure that high-pressure starting can be carried out. High-pressure starting is therefore discontinued and a changeover to low-pressure starting is made. As an alternative to interrogating the content of the cycle counter, pure time interrogation may also take place and a changeover made to low-pressure starting when the rail pressure threshold is not reached after a specific time.

If the number of cycles counted is lower than the predetermined threshold value (interrogation in method step S4), there is a branch to method step S3 again. This takes place until the pressure $P_{rail}$ in the high-pressure accumulator 28 has exceeded the threshold value P_SCHW. When this condition is satisfied, that is to say the interrogation is positive, the injection quantity MFF is read out from a characteristic map KF4 of the memory 35 in method step S8. Values for the injection quantity MFF in mg/stroke are stored in the characteristic map KF4 as a function of the coolant temperature TKW, the speed N and the content of the cycle counter. As soon as the value for the pressure threshold P_SCHW has been exceeded once, high-pressure starting remains released, even when the pressure in the high-pressure accumulator 28 subsequently falls below the threshold value again in response to the injection process.

Furthermore, the angle of the end of injection (EOI) is read out from a characteristic map KF5 of the memory 35 as a function of the coolant temperature TKW. Injection is carried out by these parameters.

Subsequently, in method step S9, it is interrogated as to whether the end of the starting process is already reached. The starting process is concluded when the speed N detected by the speed sensor has exceeded a predetermined limit value. If the interrogation gives a negative result, method step S8 is executed repeatedly, otherwise the calculation of the parameters for the injection process takes place in the customary way for operating the internal combustion engine outside the starting process (method step S10).

We claim:

1. An improved method for operating a direct-injection internal combustion engine during starting, the direct-injection internal combustion engine capable of being started selectively by one of homogeneous and stratified operation, and predetermined engine control parameters being calculated for the homogeneous and the stratified operation, the improvement which comprises:

selecting between operating with a homogenous mixture and with a stratified mixture in dependence on a variable characterizing a temperature of the direct-injection internal combustion engine;

operating with the stratified mixture only if a fuel pressure has reached a predetermined threshold value; and predetermining injection via an injection quantity and an angle of an end of injection as parameters if operating with the stratified mixture.

2. The method according to claim 1, which comprises selecting to operate with the stratified mixture if a coolant temperature has exceeded a predetermined coolant threshold value, otherwise selecting to operate with the homogeneous mixture.

3. The method according to claim 1, which comprises:

discontinuing operating with the stratified mixture if the predetermined threshold value for the fuel pressure is not reached after a specific number of cycles of the direct-injection internal combustion engine; and changing over to operate with the homogeneous mixture.

4. The method according to claim 1, which comprises during starting with the stratified mixture, determining the injection quantity in dependence on a coolant temperature, a speed of the direct-injection internal combustion engine and a value of a content of a cycle counter counting a number of cycles of the direct-injection internal combustion engine since a starting of the direct-injection internal combustion engine.

5. The method according to claim 1, which comprises fixing the angle of the end of injection in dependence on a coolant temperature.

6. The method according to claim 2, which comprises predetermining the injection via the injection quantity and an angle of a start of injection as parameters if operating with the homogeneous mixture.

7. The method according to claim 2, which comprises determining the injection quantity in dependence on the coolant temperature and a speed of the direct-injection internal combustion engine if operating with the homogeneous mixture.

8. The method according to claim 2, which comprises fixing an angle of a starting of injection in dependence on a speed and injection time if operating with the homogeneous mixture.

9. The method according to claim 1, which comprises storing the predetermined threshold value for the fuel pressure in dependence on a coolant temperature of the direct-injection internal combustion engine in a characteristic map of a memory of a control device serving for controlling the direct-injection internal combustion engine.

10. The method according to claim 2, which comprises storing values for the injection quantities for the stratified operation and the homogeneous operation of the direct-injection internal combustion engine, the angle of a start of injection and the angle of the end of injection separately in different characteristic maps of a memory of a control device serving for controlling the direct-injection internal combustion engine.

11. The method according to claim 1, which comprises limiting injection time to an earliest possible angle of starting of injection if operating with the stratified mixture.

12. The method according to claim 2, which comprises limiting an injection time with respect to the angle of the end of injection if operating with a homogeneous mixture.

* * * * *